United States Patent
Patil et al.

(10) Patent No.: US 10,057,342 B2
(45) Date of Patent: Aug. 21, 2018

(54) INFRASTRUCTURE ACCESS VIA NEIGHBOR AWARENESS NETWORKING DATA PATH

(71) Applicant: QUALCOMM Incorporated, San Diego, CA (US)

(72) Inventors: Abhishek Pramod Patil, San Diego, CA (US); George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 14/842,700

(22) Filed: Sep. 1, 2015

(65) Prior Publication Data
US 2016/0073330 A1 Mar. 10, 2016

Related U.S. Application Data

(60) Provisional application No. 62/046,735, filed on Sep. 5, 2014.

(51) Int. Cl.
*H04L 29/08* (2006.01)
*H04L 29/12* (2006.01)
(Continued)

(52) U.S. Cl.
CPC ...... *H04L 67/1068* (2013.01); *H04L 61/2015* (2013.01); *H04L 67/16* (2013.01); *H04L 67/2809* (2013.01); *H04L 69/08* (2013.01); *H04W 8/005* (2013.01); *H04W 40/246* (2013.01); *H04W 84/22* (2013.01); *H04W 88/04* (2013.01); *H04W 88/10* (2013.01)

(58) Field of Classification Search
CPC .................. H04L 67/1068; H04L 61/2015
USPC ........................................... 709/220
See application file for complete search history.

(56) References Cited

U.S. PATENT DOCUMENTS

2006/0171403 A1   8/2006   Kim et al.
2008/0005306 A1   1/2008   Kushalnagar et al.
(Continued)

FOREIGN PATENT DOCUMENTS

WO       03021978 A1     3/2003
WO    2005039118 A2     4/2005

OTHER PUBLICATIONS

Droms, RFC 2131, Mar. 1997, IETF (45 pages).*
International Search Report and Written Opinion—PCT/US2015/048179—ISA/EPO—dated Dec. 8, 2015.

*Primary Examiner* — Wing F Chan
*Assistant Examiner* — Leon Y Tseng
(74) *Attorney, Agent, or Firm* — Toler Law Group

(57) ABSTRACT

A first neighbor awareness networking (NAN) device may access data network infrastructure and may advertise a service associated with the data network infrastructure to a second NAN device. For example, the first NAN device may announce the service via a service announcement. The second NAN device may subscribe to the service through the first NAN device, and the second NAN device may proxy the service announcement to another NAN device. The other NAN device may also subscribe to the service in response to receiving the service announcement. For example, the second NAN device may operate as a "relay point" to provide the service to the other NAN device.

24 Claims, 13 Drawing Sheets

(51) Int. Cl.
*H04W 40/24* (2009.01)
*H04L 29/06* (2006.01)
*H04W 8/00* (2009.01)
*H04W 84/22* (2009.01)
*H04W 88/04* (2009.01)
*H04W 88/10* (2009.01)

(56) References Cited

U.S. PATENT DOCUMENTS

| | | | |
|---|---|---|---|
| 2014/0302786 A1* | 10/2014 | Kasslin | H04W 8/005 |
| | | | 455/41.2 |
| 2015/0230207 A1* | 8/2015 | Wang | H04W 76/15 |
| | | | 348/143 |
| 2017/0111849 A1* | 4/2017 | Park | H04W 48/08 |

* cited by examiner

| Field | Size (Octets) | Value | Description |
|---|---|---|---|
| Attribute ID | 1 | 221 | |
| Length | 1 | Variable | |
| OUI | 3 | TBD | Manufacturer Organizationally Unique Identifier |
| Vendor Attribute Type | 1 | 1 | Manufacturer Mesh Attribute |
| Device MAC | 6 | Variable | MAC of NAN Device Having Access to Infrastructure |
| Gateway MAC | 6 | Variable | MAC of the Gateway Server in the Infrastructure |

INFRASTRUCTURE ACCESS VIA NEIGHBOR AWARENESS NETWORKING DATA PATH

I. CLAIM OF PRIORITY

The present application claims priority from U.S. Provisional Patent Application No. 62/046,735 entitled "INFRASTRUCTURE ACCESS VIA NEIGHBOR AWARENESS NETWORKING DATA PATH," filed Sep. 5, 2014, the contents of which are incorporated by reference in their entirety.

II. FIELD

The present disclosure is generally related to accessing infrastructure via neighbor awareness networking.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Neighbor Awareness Networking (NAN) communication may be conducted by NAN devices, such as wireless telephones and other wireless devices, that communicate data using a central node or server. According to one implementation, the central node may include an access point. NAN communication may support one-hop service discovery among different nodes or NAN devices. For example, a central network node may function as a "provider" of a particular service, and nodes within a one-hop range of the central node may subscribe to the particular service. However, nodes within a multi-hop range of the central node may not be able to subscribe to the particular service, which may limit the amount of nodes that are able to subscribe to the particular service.

IV. SUMMARY

According to one implementation of the present disclosure, an apparatus for use with a Neighbor Awareness Networking (NAN) data path network. The apparatus includes a processor and a memory coupled to the processor. The memory stores instructions that are executable by the processor to perform operations including accessing, at a first NAN device of a plurality of NAN devices, data network infrastructure to obtain information regarding a data network infrastructure service. The operations also include sending a service announcement associated with the data network infrastructure service from the first NAN device to a second NAN device of the plurality of NAN devices to announce the data network infrastructure service to the second NAN device. The NAN data path network includes the plurality of NAN devices.

According to another implementation of the present disclosure, a method for use with a Neighbor Awareness Networking (NAN) data path network is disclosed. The method includes accessing, at a first NAN device of a plurality of NAN devices, data network infrastructure to obtain information regarding a data network infrastructure service. The method also includes sending a service announcement associated with the data network infrastructure service from the first NAN device to a second NAN device of the plurality of NAN devices to announce the data network infrastructure service to the second NAN device. The NAN data path network includes the plurality of NAN devices.

According to another implementation of the present disclosure, a non-transitory computer readable medium includes instructions. The instructions, when executed by a processor, cause the processor to perform operations for use with a Neighbor Awareness Networking (NAN) data path network. The operations include accessing, at a first NAN device of a plurality of NAN devices, data network infrastructure to obtain information regarding a data network infrastructure service. The operations also include sending a service announcement associated with the data network infrastructure service from the first NAN device to a second NAN device of the plurality of NAN devices to announce the data network infrastructure service to the second NAN device. The NAN data path network includes the plurality of NAN devices.

According to another implementation of the present disclosure, an apparatus for use with a Neighbor Awareness Networking (NAN) data path network. The apparatus includes means for accessing data network infrastructure to obtain information related to a data network infrastructure service. The means for accessing is included in a first NAN device of a plurality of NAN devices. The apparatus also includes means for sending a service announcement associated with the data network infrastructure service from the first NAN device to a second NAN device of the plurality of NAN devices. The NAN data path network includes the plurality of NAN devices.

V. BRIEF DESCRIPTION OF THE DRAWINGS

FIG. 2 is a particular illustrative implementation of a service announcement information element (IE);

Figure 7A:
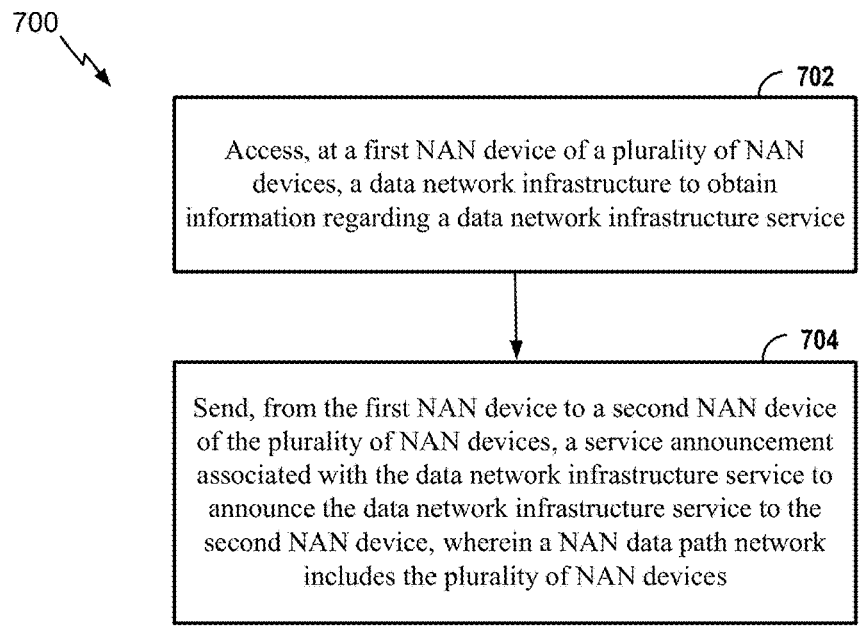
Figure 7B:
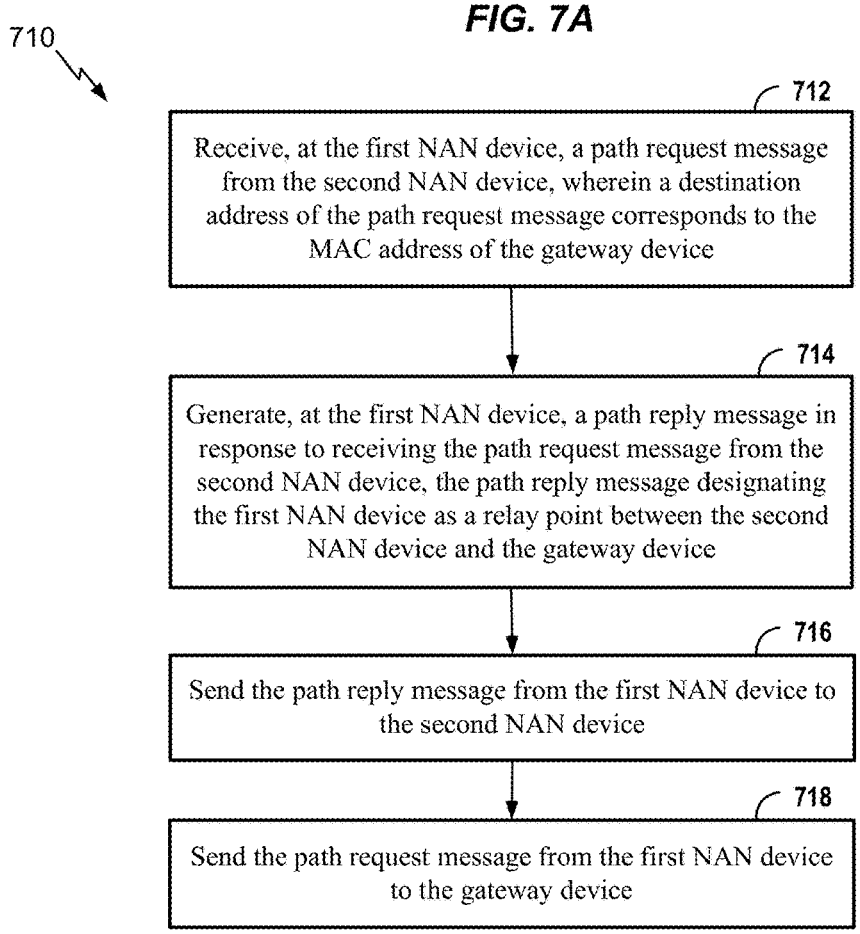
Figure 8:
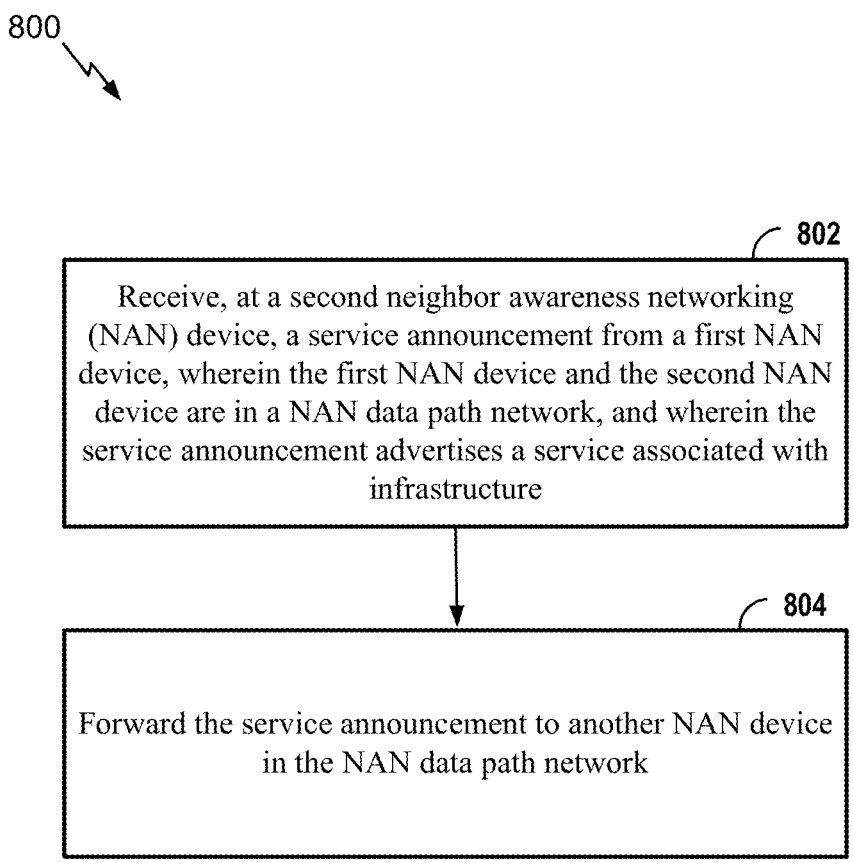
Figure 9:
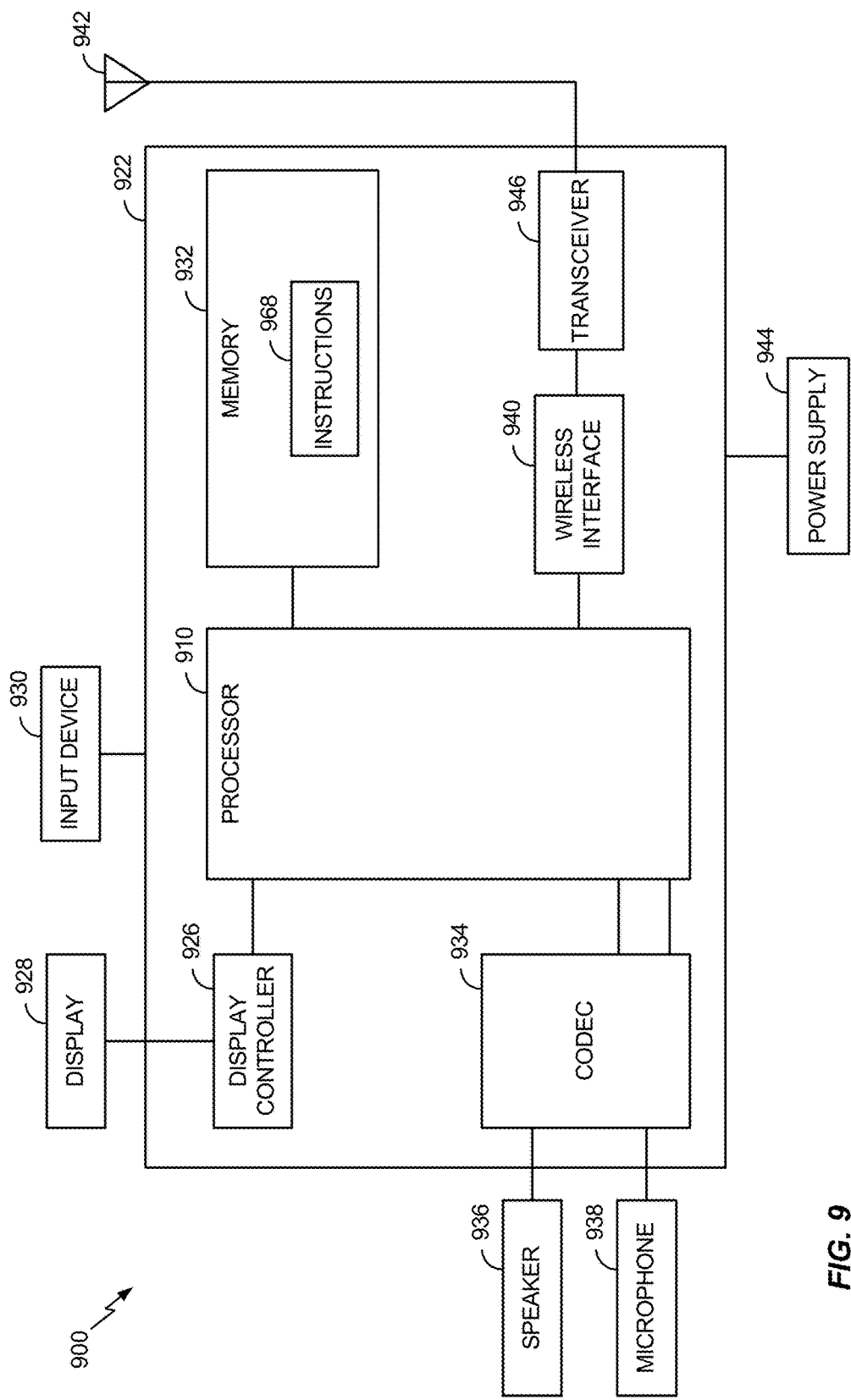

FIGS. 6A-6E include diagrams of a system that enable a NAN device to provide backhaul connectivity;

FIG. 7A is a flow diagram of an illustrative method for announcing a data network infrastructure service in a NAN data path network;

FIG. 7B is a flow diagram of an illustrative method for establishing a relay point between a NAN device and data network infrastructure;

FIG. 8 is a flow diagram of an illustrative method for accessing a data network infrastructure via a NAN data path network; and FIG. 9 is a diagram of a wireless device that is operable to support various implementations of one or more methods, systems, apparatuses, and/or computer-readable media disclosed herein.

VI. DETAILED DESCRIPTION

The present disclosure is directed to systems and methods that enable data network infrastructure access via a Neighbor Awareness Networking (NAN) data path network. A data network infrastructure may be accessible to a first NAN device, such as a NAN access point, of the NAN data path network. For example, the first NAN device may be coupled to a gateway of the data network infrastructure. The first NAN device may subscribe to a data network infrastructure service via the gateway. Additionally, the first NAN device may advertise the data network infrastructure service to other NAN devices within the NAN data path network by providing service announcements to NAN devices within a one-hop range of the first NAN device. As used herein, "advertising" a service to other NAN devices may include at least one of broadcasting the service to other NAN devices, informing other NAN devices of the service, or announcing the service to other NAN device. The service announcements may include a media access control (MAC) address of the gateway and a MAC address of the first NAN device.

If a particular NAN device within the one-hop range of the first NAN device determines to subscribe to the data network infrastructure service after receiving a service announcement, the first NAN device may "authenticate" the particular NAN device with the data network infrastructure. For example, the first NAN device may function as a "relay point" between the particular NAN device and the data network infrastructure such that packets associated with the data network infrastructure service are forwarded between the gateway and the particular NAN device via the first NAN device. Additionally, the NAN devices within the one-hop range of the first NAN device may proxy or relay the service announcements to other devices, such as devices within a two-hop range of the first NAN device. If a device within the two-hop range of the first NAN device determines to subscribe to the data network infrastructure service after receiving a service announcement, a path may be formed to the gateway via the first NAN device and the relaying device such that the device may access the data network infrastructure. NAN devices outside of a two-hop range, such as NAN devices in a three-hop range, a fourth-hop range, etc., may also subscribe to the data network infrastructure service according to a similar technique. Thus, multi-hop service discovery for devices within a NAN data path network may be achieved.

One advantage provided by at least one of the disclosed examples is an implementation of multi-hop service discovery and multi-hop connectivity within a Neighbor Awareness Networking (NAN) data path network to provide data network infrastructure access to NAN devices that are not "directly coupled" to the data network infrastructure. Other aspects, advantages, and features of the present disclosure will become apparent after review of the entire application.

Particular implementations of the present disclosure are described below with reference to the drawings. In the description, common features are designated by common reference numbers throughout the drawings.

Figure 1:
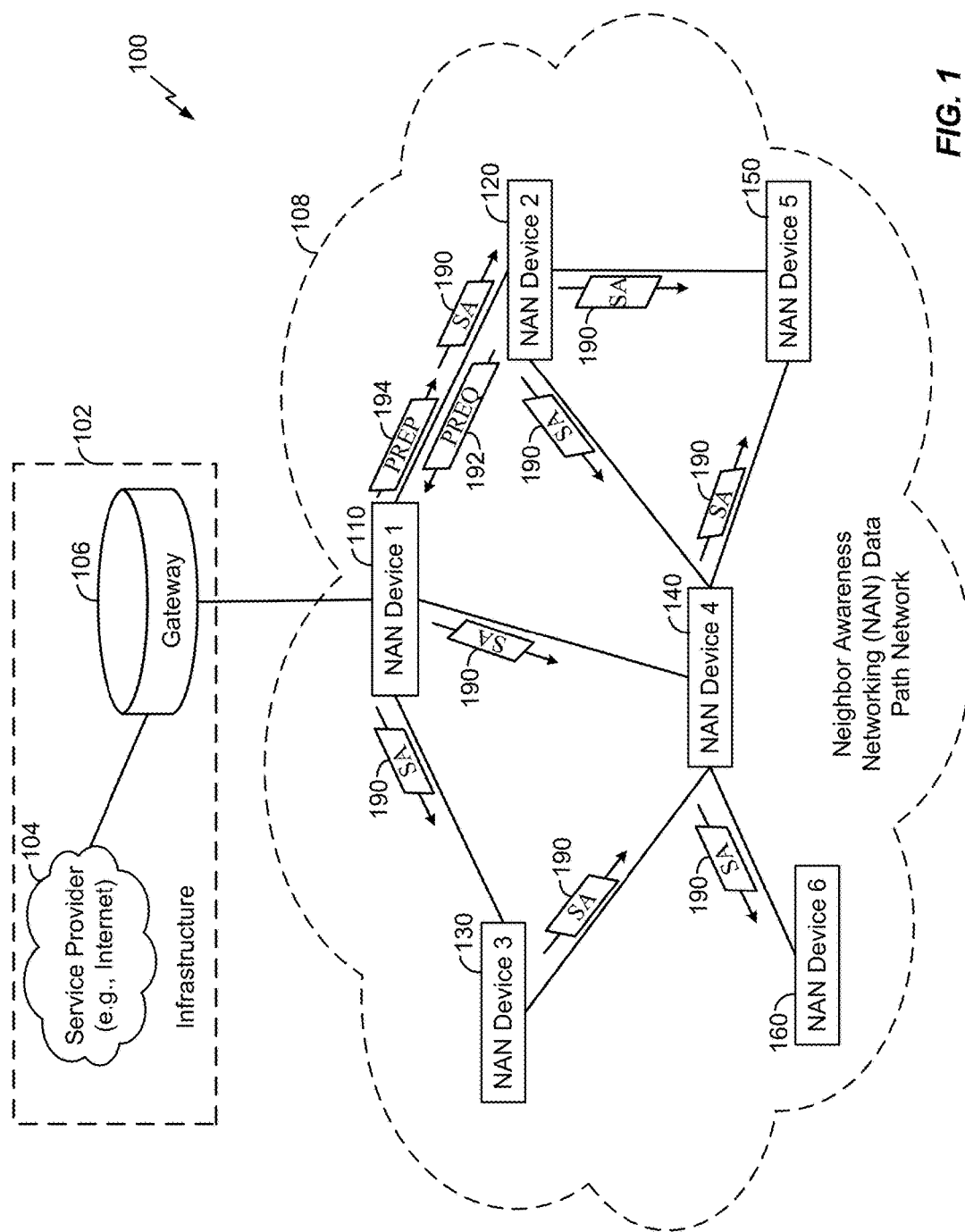
FIG. 1 is a diagram of a particular illustrative implementation of a system that includes a data network infrastructure that is accessible via a neighbor awareness networking (NAN) data path network.

Referring to FIG. 1, a particular implementation of a system 100 that includes infrastructure 102 that is accessible via a neighbor awareness networking (NAN) data path network 108 is shown. As used herein, "infrastructure", such as the infrastructure 102 of FIG. 1, may be used interchangeably with "data network infrastructure". The NAN data path network 108 supports multi-hop service discovery and multi-hop infrastructure access.

The infrastructure 102 includes a service provider 104 coupled to a gateway 106. The infrastructure 102 is a wired network that may have access to an outside network. The wired network may include at least one of a router, an Ethernet switch, or a server. In a particular implementation, the service provider 104 may provide a service to subscriber units that subscribe to the service via the gateway 106. Non-limiting examples of the service may include an internet service, an application service, a file-sharing service, etc. The gateway 106 may have a media access control (MAC) address to enable the subscriber units to identify the gateway 106 during subscription activities. In a particular implementation, the gateway 106 may include a dynamic host configuration protocol (DHCP) server that is configured to generate internet protocol (IP) addresses for subscriber units that subscribe to the service.

The NAN data path network 108 may include a first NAN device (NAN Device 1) 110, a second NAN device (NAN Device 2) 120, a third NAN device (NAN Device 3) 130, a fourth NAN device (NAN Device 4) 140, a fifth NAN device (NAN Device 5) 150, and a sixth NAN device (NAN Device 6) 160. The first NAN device 110 may be a NAN access point device of the NAN data path network 108. For example, the first NAN device 110 may have "direct access" to the infrastructure 102.

The first NAN device 110 may be configured to access the infrastructure 102 via the gateway 106. Based on the access to the infrastructure 102, the first NAN device 110 may also be configured to subscribe to a service, such as an infrastructure service, of the service provider 104 via the gateway 106. Upon subscribing to the service, the first NAN device 110 may be configured to provide a service announcement (SA) 190 to the second NAN device 120, the third NAN device 130, and the fourth NAN device 140. For example, during a paging window, the first NAN device 110 may signal to the NAN devices 120-140 to remain active during a transmit window. The paging window may include a time period when NAN devices within a one-hop range or a multi-hop range (e.g., a "NAN data path group") of the first NAN device 110 listen for paging messages. In a particular implementation, NAN devices 110-140 within a NAN data path group may have common security credentials, such as a common key exchange and use of an encryption process using the same key. During the transmit window, the first NAN device 110 may transmit service announcements 190 to each NAN device 120-140 within a one-hop range of the first NAN device 110.

The service announcements 190 may advertise the service subscribed to by the first NAN device 110, such as the service associated with the infrastructure 102, and may include information for connecting other NAN devices 120-160 to the infrastructure 102. For example, the service announcements 190 may include the MAC address of the gateway 106 and a MAC address of the first NAN device 110 or the access point. The service announcements 190 may also include an information element (IE) defining attributes of the service, as described in further detail with respect to FIG. 2.

One or more of the NAN devices 120-140 may subscribe to the service in response to receiving the service announcements 190. For example, each NAN devices 120-140 may initiate an authentication process between the corresponding NAN device 120-140 and the first NAN device 110 to subscribe to the service. The authentication process is described with respect to the second NAN device 120 and the first NAN device 110; however, similar authentication processes may be performed between the first NAN device 110 and the other NAN devices 130, 140 within a one-hop range of the first NAN device 110.

The second NAN device 120 may be configured to send a path request (PREQ) message 192 to the gateway 106 via the first NAN device 110 using a hybrid wireless mesh protocol (HWMP) as defined by IEEE 802.11s. For example, the second NAN device 120 may use the MAC address of the gateway 106 (in an information element (IE) as described in FIG. 2) and the MAC address of the first NAN device 110 (in the IE 200) to send the path request message 192 to the gateway 106 via the first NAN device 110. The first NAN device 110 may receive the path request message 192 from the second NAN device 120 and may forward the path request message 192 to the gateway 106. In a particular implementation, the path request message 192 may include a dynamic host configuration (DHCP) request. For example, the second NAN device 120 may request an internet protocol (IP) address from the DHCP server at the gateway 106 via the DHCP request. If the gateway 106 includes a DHCP server, the gateway 106 may send an IP address to the second NAN device 120 via the first NAN device 110. According to one implementation, communications with respect to the present disclosure may be compatible with the Internet Protocol Version 6 (IPv6) communications protocol. For example, communications within the system 100 may be based on the IPv6 communications protocol.

The first NAN device 110 may also generate a path reply (PREP) message 194 in response to receiving the path request message 192 and may send the path reply message 194 to the second NAN device 120. The path reply message 194 may designate the first NAN device 110 as a "relay point" to the gateway 106. For example, the path reply message 194 may instruct the second NAN device 120 to send (or forward from other NAN devices) packets associated with the service to the first NAN device 110. In turn, the first NAN device 110 forwards the packets to the gateway 106. Thus, the first NAN device 110 may "authenticate" the second NAN device 120 with the infrastructure 102 and may forward packets between the gateway 106 and the second NAN device 120 to enable the second NAN device 120 to access the infrastructure 102.

In a particular implementation, the path reply message may also include the IP address from the DHCP server at the gateway 106. For example, the first NAN device 110 may forward the IP address from the gateway 106 to the second NAN device 120. In another particular implementation, the first NAN device 110 may forward the IP address to the second NAN device 120 in a packet that is distinct from the path reply message. If the second NAN device 120 does not receive an IP address within a particular time period after sending the DHCP request, the second NAN device 120 may generate an IP address according to a link-local IP mechanism. In a particular implementation, the link-local IP mechanism may be compatible with an Internet Protocol Version 6 (IPv6) communications protocol.

Each NAN device 120-140 that received a service announcement 190 from the first NAN device 110 may proxy or relay the service announcement 190 to other NAN devices 140-160, such as NAN devices within a two-hop range of the first NAN device 110. For example, the third NAN device 130 may relay the service announcement 190 to the fourth NAN device 140, the second NAN device 120 may relay the service announcement 190 to the fourth and fifth NAN devices 140, 150, and the fourth NAN device 140 may relay the service announcement 190 to the fifth and sixth NAN devices 150, 160. Upon receiving a service announcement 190, the other NAN devices 140-160 may subscribe to the service via an authentication process.

The authentication process is described with respect to the sixth NAN device 160; however, similar authentication processes may be performed with respect to other NAN devices, such as the fifth NAN device 150. The fourth NAN device 140 may forward a service announcement 190 to the sixth NAN device 160. The service announcement forwarded to the sixth NAN device 160 may include a MAC address of the fourth NAN device 140 (or the forwarding NAN device). The sixth NAN device 160 may send a path request (PREQ) message to the gateway 106 via the fourth NAN device 140 using the HWMP. For example, the sixth NAN device 160 may use the MAC address of the fourth NAN device 140 to send the path request message. Upon receiving the path request, the fourth NAN device 140 may forward the path request to the first NAN device 110, and the first NAN device 110 may forward the path request to the gateway 106.

The fourth NAN device 140 may also generate a path reply (PREP) message in response to receiving the path request message and may send the path reply message to the sixth NAN device 160. The path reply message may designate the fourth NAN device 140 as a "relay point" to the gateway 106. For example, the path reply message may instruct the sixth NAN device 160 to send (or forward from other NAN devices) packets associated with the service to the fourth NAN device 140. In turn, the fourth NAN device 140 forwards the packets to the first NAN device 110, and the first NAN device 110 forwards the packets to the gateway 106. Thus, the fourth NAN device 140 may "authenticate" the sixth NAN device 160 with the infrastructure 102.

Although FIG. 1 illustrates the gateway 106 as a separate device from a NAN device, in other implementations, a NAN device may operate as a gateway to the infrastructure 102. As a non-limiting example, the first NAN device 110 may operate in a substantially similar manner as the gateway 106, and the other NAN devices 120-160 may communicate with the service provider 104 directly from the first NAN device 110. To illustrate, the NAN device 110 may have a wired or wireless connection to the service provider 104 (or another external source). If the first NAN device 110 is operating as the gateway, then the first NAN device 110 may advertise an "infrastructure attribute", a "gateway attribute", or an "infrastructure service" to the other NAN devices 120-160. The infrastructure attribute may indicate to the other NAN devices 120-160 that the first NAN device 110 has a strong connectivity with the infrastructure 102 and that the first NAN device 110 may forward data packets between the infrastructure 102 and the other NAN devices 120-160.

According to some implementations, each NAN device 110-160 may be operable to operate as a gateway to the service provider 104. A negotiation process based on connectivity factors may determine which of the NAN devices 110-160 serves as the gateway. For example, if the first NAN device 110 has a greater signal strength than the other NAN devices 110-160, the first NAN device 110 may operate as the gateway and the other NAN devices 120-160 may communicate with the service provider 104 (or infrastructure) using the first NAN device 110. However, if the signal strength of the fifth NAN device 150 becomes greater than the signal strength of the first NAN device 110, the fifth NAN device 150 may send or broadcast a message within the NAN data path network 108 indicating that the fifth NAN device 150 is replacing the first NAN device 110 as the gateway. As a result, the other NAN devices 110-140, 160 may communicate with the service provider 104 using the fifth NAN device 150. Each NAN device 110-160 may periodically transmit signal strength indicators within the NAN data path network 108. In response to receiving the signal strength indicators for other NAN devices, the NAN devices 110-160 may compare the signal strength indicators to determine which NAN device 110-160 is to operate as the gateway. For example, the NAN device 110-160 having a signal strength indicator indicating the strongest strength may be designated as the gateway.

According to another implementation, one NAN device may operate as the gateway and another NAN device may operate as a "candidate gateway". As a non-limiting example, the first NAN device 110 may operate as the gateway to the infrastructure 102 and the second NAN device 120 may be designated as the candidate gateway or backup gateway. According to one implementation, the candidate gateway may be the NAN device that has the second highest signal strength and the operating gateway may be the NAN device that has the highest signal strength. In the above example, if the first NAN device 110 loses connectivity, is powered down, or experiences reduced signal strength, the second NAN device 120 may operate as the gateway. The other NAN devices 130-160 may establish connectivity with the candidate gateway while the operating gateway is providing gateway services. Thus, if the operating gateway experiences connectivity problems, relatively seamless handoff to the candidate gateway may be achieved. According to one implementation, the operating gateway may transmit a message to the candidate gateway indicating that the operating gateway is no longer serving as the gateway. In this scenario, the candidate gateway may transmit a message to the other devices in the NAN data path network 108 indicating that the candidate gateway is replacing the operating gateway.

The system 100 of FIG. 1 may enable NAN devices 120-160 to access the infrastructure 102 and subscribe to the service associated with the infrastructure via the first NAN device 110. For example, the first NAN device 110 may function as an access point and advertise the service to other devices within the NAN data path network 108. Thus, multi-hop service discovery and multi-hop connectivity may be implemented within the NAN data path network 108 to provide infrastructure access to the NAN devices 120-160 that are not "directly coupled" to the gateway 106.

Referring to FIG. 2, a particular illustrative implementation of a service announcement information element (IE) 200 that may be provided by the first NAN device 110 of FIG. 1 is shown. The IE 200 may include an attribute identifier field, a length field, an organizationally unique identifier (OUI) field, a vendor attribute type field, a device MAC field, and a gateway MAC field. In a particular implementation, the IE 200 may be included in the service announcement 190 of FIG. 1.

The attribute identifier field may be an 8-bit field (or a 1-byte field) that identifies attributes or vendor specific attributes of the service provided to the first NAN device 110 by the service provider 104 of FIG. 1. In other implementations, the attribute identifier may identify services that the access point or gateway may provide. For example, the attribute identifier may provide information regarding a service carrier of the service. In another implementation, the attribute identifier may identify parameters that may assist a subscribing station in selecting an access point. For example, if there are multiple access points, the attribute identifier may identify connectivity properties of each access point. Based on the connectivity properties identified by the attribute identifier, a subscribing station may subscribe to one of the access points. The service may include an internet service, an application service, a file-sharing service, etc. The length field may be an 8-bit field that indicates the length of the IE 200. The OUI field may be a 24-bit field (or a 3-byte field) that identifies the OUI of the manufacturer of the access point or the first NAN device 110. The vendor attribute type field may be an 8-bit field that indicates mesh attributes or mesh capabilities of the manufacturer of the access point. The device MAC field may be a 48-bit field (or a 6-byte field) that indicates the MAC address of the first NAN device 110 or a device having access to the infrastructure 102. The gateway MAC field may be a 48-bit field that indicates the MAC address of the gateway 106 or a gateway server of the infrastructure 102.

Figure 3:
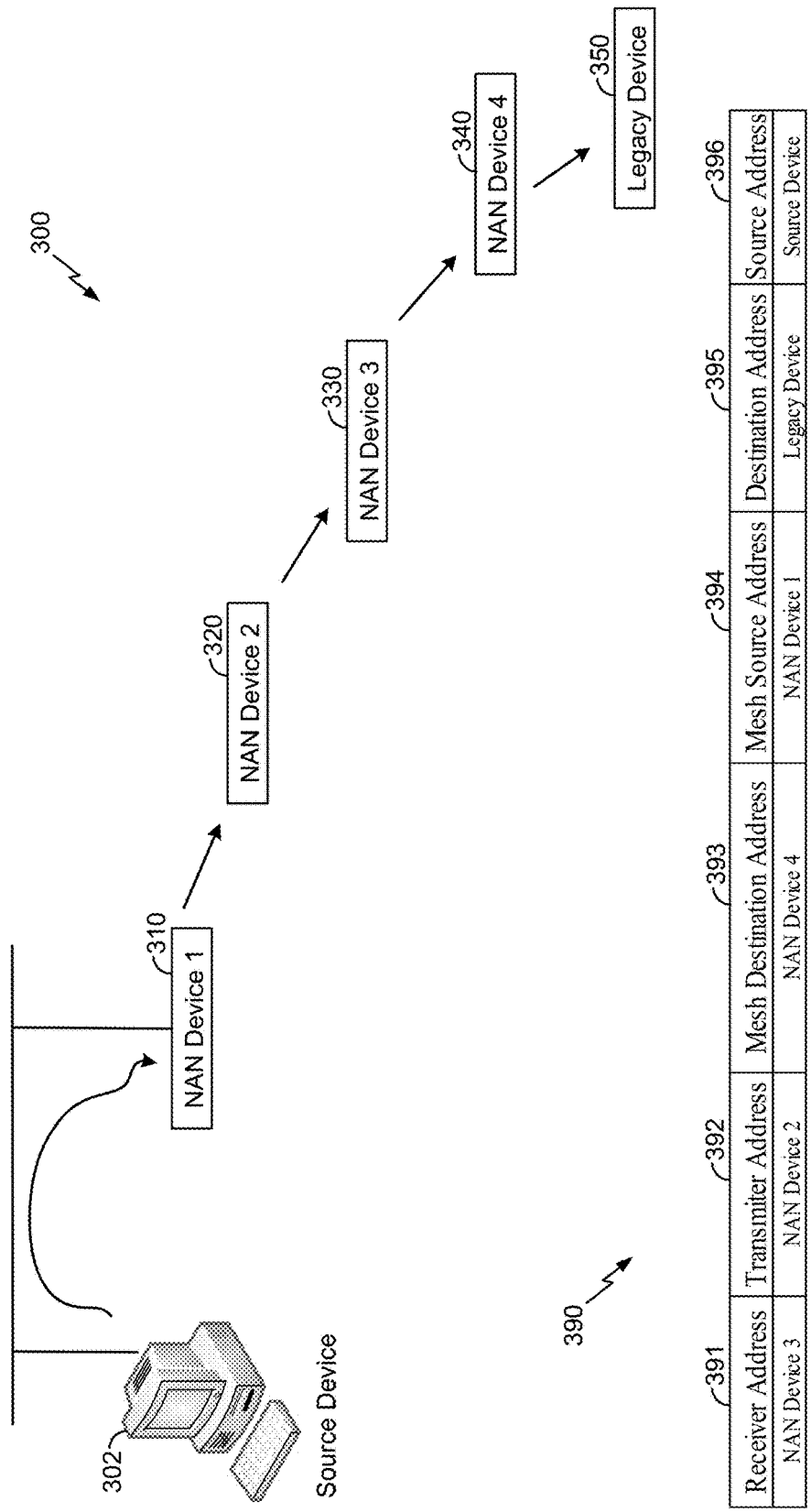
FIG. 3 is a particular illustrative implementation of a system that is operable to use a six-address format as defined in Institute of Electrical and Electronics Engineers (IEEE) 802.11s to facilitate communication between a data network infrastructure and a legacy device.

Referring to FIG. 3, a particular implementation of a system 300 is shown. The system 300 may support communication between a three-address legacy station and infrastructure via a NAN data path network. The communications (or the packets) between the three-address legacy station and the infrastructure may use a six-address format, such as defined in IEEE 802.11s. The system 300 may include a source device 302, a first NAN device 310, a second NAN device 320, a third NAN device 330, a fourth NAN device 340, and a legacy device 350. The source device 302 may be a non-mesh device in an infrastructure network. As used herein, a "non-mesh device" may include a device that is not compatible with the IEEE 802.11s protocol. The source device 302 may correspond to the gateway 106 in the infrastructure 102 of FIG. 1. Additionally, the legacy device 350 may be a non-mesh device or a device that is not configured to support mesh networking.

The first NAN device 310, the second NAN device 320, the third NAN device 330, and the fourth NAN device 340 may be included in a NAN data path network, such as a wireless mesh network. The first NAN device 310 may have access to the infrastructure 102. For example, the first NAN device 310 device may function as a NAN access point device of the NAN data path network and may operate in a substantially similar manner as the first NAN device 110 of FIG. 1. The first NAN device 310 may subscribe to a service associated with the source device 302 and may provide a service announcement (associated with the service) to the second NAN device 320.

The second NAN device 320 may receive the service announcement from the first NAN device 310 and may subscribe to the service. Additionally, the second NAN device 320 may forward the service announcement to the third NAN device 330. The third NAN device 330 may receive the service announcement from the second NAN device 320 and may subscribe to the service. Additionally, the third NAN device 330 may forward the service announcement to the fourth NAN device 340.

The fourth NAN device 340 may receive the service announcement from the third NAN device 330 and may subscribe to the service. According to the IEEE 802.11s protocol, the fourth NAN device 340 may operate in a substantially similar manner as a destination station in the wireless mesh network. Additionally, the fourth NAN device 340 may operate as an access point to the legacy device 350. According to one implementation, the legacy device 350 may be a three-address legacy station according to the IEEE 802.11s protocol. For example, the fourth NAN device 340 may forward the service announcement to the legacy device 350, enabling the legacy device 350 to subscribe to the service.

The NAN devices 310-340 may use six-address formatting to enable connection between the legacy device 350 and the infrastructure (or the source device 302). For example, a mesh control field 390 in packets that are forwarded between the legacy device 350 and the source device 302 may include six address fields 391-396, an extended address format as compared to a typical four-address field in the IEEE 802.11s protocol.

In the illustrated implementation, the first address field 391 is a receiver address field that includes a MAC address of the third NAN device 330, the second address field 392 is a transmitter address field that includes a MAC address of the second NAN device 320, the third address field 393 is a mesh destination address field that includes a MAC address of the fourth NAN device 340, and the fourth address field 394 is a mesh source address field that includes a MAC address of the first NAN device 310. The extended address format also includes a fifth address field 395 and a sixth address field 396. The fifth address field is a destination address field that includes a MAC address of the legacy device 350, and the sixth address field 396 is a source address field that includes a MAC address of the source device 302. Although the fields 391-396 have been described as MAC addresses, in other implementations, one or more of the fields 391-396 may indicate another address type, such as a network-assigned identifier.

The six-address capability may be advertised by the fourth NAN device 340 via an infrastructure attribute. The fourth NAN device 340 may be the NAN access point for the legacy device 350. The fourth NAN device 340 may advertise to the other NAN devices 310-330 (or the intermediate nodes) that the legacy device 350 is attempting to subscribe to the service. In response to the advertisement, the other NAN devices 310-330 may "activate" their six address capability to forward packets (using the six-address format) between the source device 302 and the legacy device 350.

The system 300 of FIG. 3 enables the legacy device 350 to subscribe to a service of an infrastructure device, such as the source device 302, via NAN devices 310-340 in a NAN data path network. For example, the NAN devices 310-340 may adopt the six-address format communication between a three-address legacy station, such as the legacy device 350, and a non-mesh device, such as the source device 302.

Figure 4:
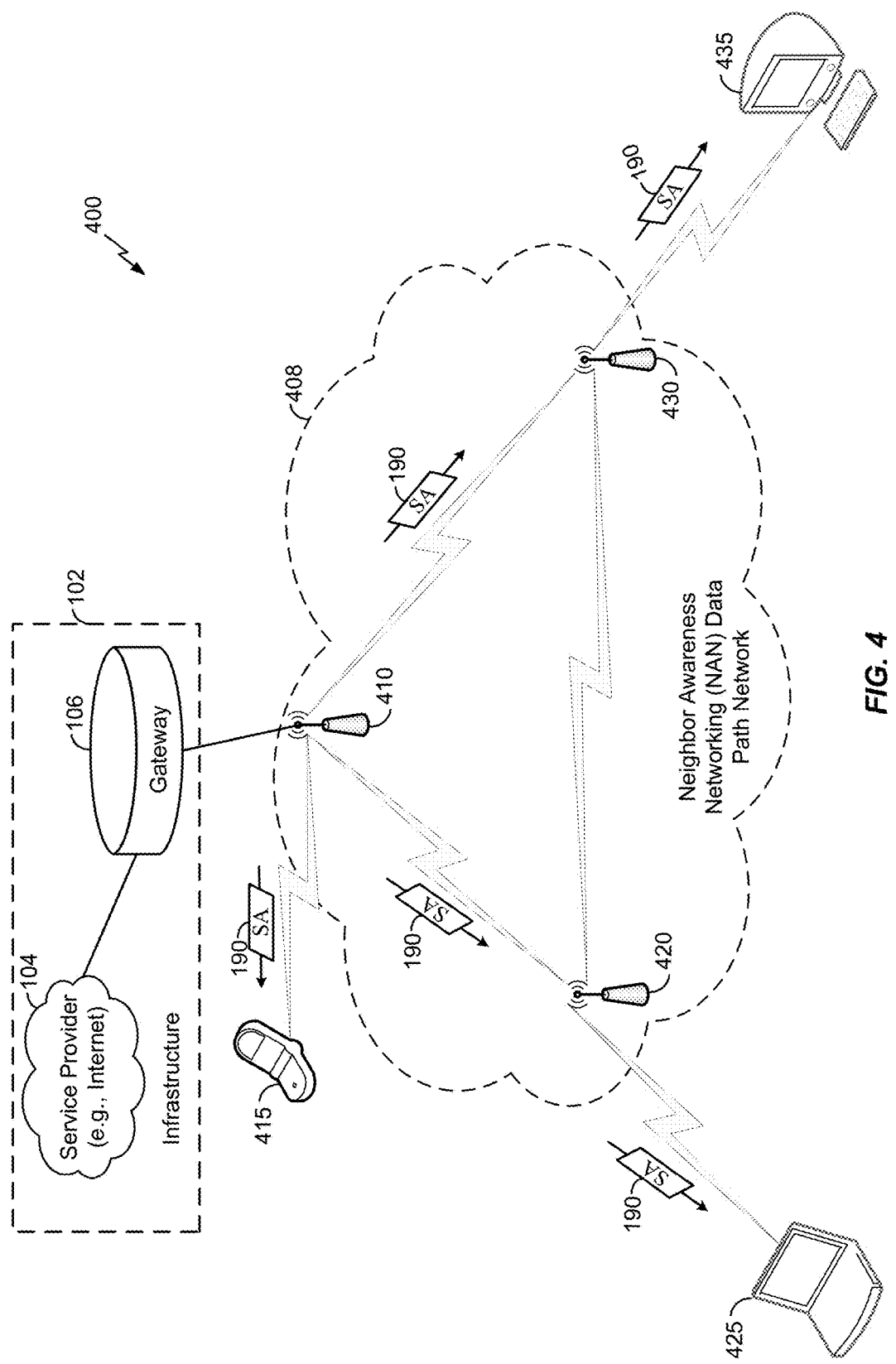
FIG. 4 is a diagram of another particular illustrative implementation of a system that includes a data network infrastructure that is accessible via a NAN data path network.

Referring to FIG. 4, another particular implementation of a system 400 that includes infrastructure that is accessible via a NAN data path network is shown. The system 400 includes the infrastructure 102 and a NAN data path network 408.

The infrastructure 102 includes the service provider 104 (or service provider equipment) and the gateway 106. The NAN data path network 408 may include a NAN access point 410, a first NAN relay access point 420, and a second NAN relay access point 430. The NAN access point 410 may be configured to access the infrastructure 102 via the gateway 106. Based on the access to the infrastructure 102, the NAN access point 410 may provide service announcements 190 to the first NAN relay access point 420 and to the second NAN relay access point 430. For example, the NAN access point 410 may advertise a service of the service provider 104 to the NAN relay access points 420, 430 via the service announcements 190.

Additionally, the NAN access point 410 may advertise the service to a first client device 415 (or a "Wi-Fi" client device) that is connected to the NAN access point 410. The first client device 415 may subscribe to the service using an authentication process with the NAN access point 410 in a similar manner as described with respect to FIG. 1. Packets to the infrastructure 102 may be routed to the NAN access point 410, and the NAN access point 410 may forward the packets to the infrastructure 102 or to the gateway 106.

The NAN relay access points 420, 430 may proxy or relay the service announcements 190 to other devices outside of the NAN data path network 408 so that the other devices may subscribe to the service and access the infrastructure 102 via a multi-hop route. For example, the first NAN relay access point 420 may proxy a service announcement 190 to a second client device 425, and the second NAN relay access point 430 may proxy a service announcement 190 to a third client device 435. The second client device 425 may subscribe to the service and may access the infrastructure 102 via a multi-hop route. For example, the second client device 425 may access the infrastructure 102 via the first NAN relay access point 420 and the NAN access point 410. In a similar manner, the third client device 435 may subscribe to the service and may access the infrastructure 102 via a multi-hop route. For example, the third client device 435 may access the infrastructure 102 via the second NAN relay access point 430 and the NAN access point 410. In a particular implementation, the client devices 425, 435 may be legacy Wi-Fi client devices that may access the infrastructure 102 via the NAN data path network 408. The client devices 425, 435 may also send communications (or packets) to one another via the NAN data path network 408.

The system 400 of FIG. 4 may enable the client devices 415, 425, 435 to access the infrastructure 102 and to subscribe to one or more services associated with the infrastructure 102 via the NAN access point 410. For example, the first client device 415 may access the infrastructure 102 via single-hop discovery, and the second and third client devices 425, 435 may access the infrastructure 102 via multi-hop discovery.

Figure 5:
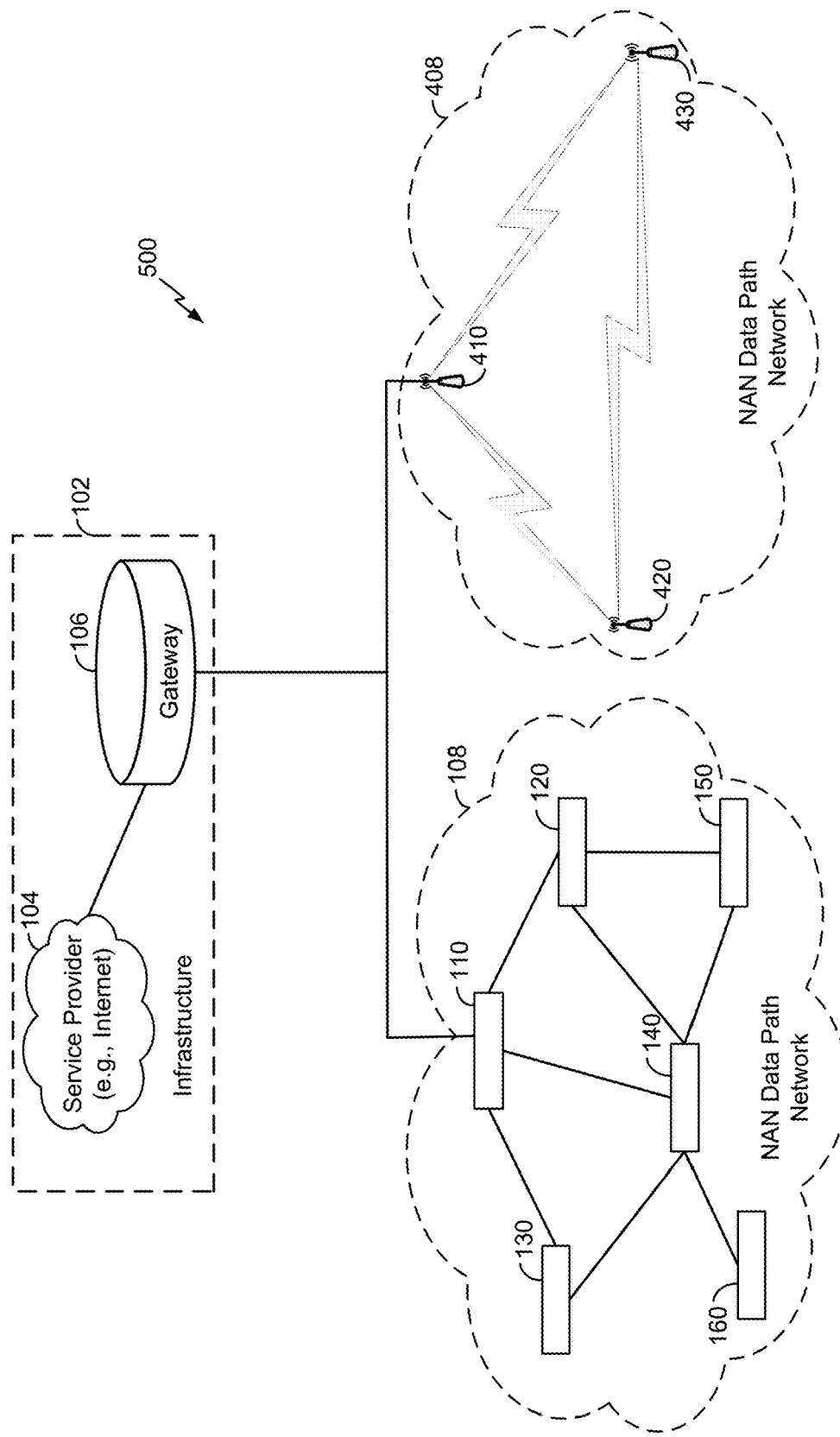
FIG. 5 is a diagram of another particular illustrative implementation of a system that includes a data network infrastructure that is accessible via NAN data path networks.

Referring to FIG. 5, a particular implementation of a system 500 that includes infrastructure that is accessible via multiple NAN data path networks is shown. The system 500 includes the infrastructure 102, a first NAN data path network, such as the NAN data path network 108, and a second NAN data path network, such as the NAN data path network 408.

Components within different NAN data path networks 108, 408 that are coupled to the infrastructure 102 may communicate with one another via the infrastructure 102 or the gateway 106. For example, the first NAN device 110 of the NAN data path network 108 may communicate with the NAN access point 410 of the NAN data path network 408 via the gateway 106. Because the gateway 106 supports bi-directional communication with the first NAN device 110 and bi-directional communication with the NAN access point 410, the first NAN device 110 may send packets to the gateway 106, and the gateway 106 may forward the packets to the NAN access point 410. Communicating via the gateway 106 may enable components of the NAN data path network 108 and components of the NAN data path network 408 to communicate with one another without forming extensive wireless mesh paths that may utilize a relatively large number of hops. For example, the first NAN device 110 may communicate with the NAN access point 410 without using multiple "relay stations."

Figure 6A:
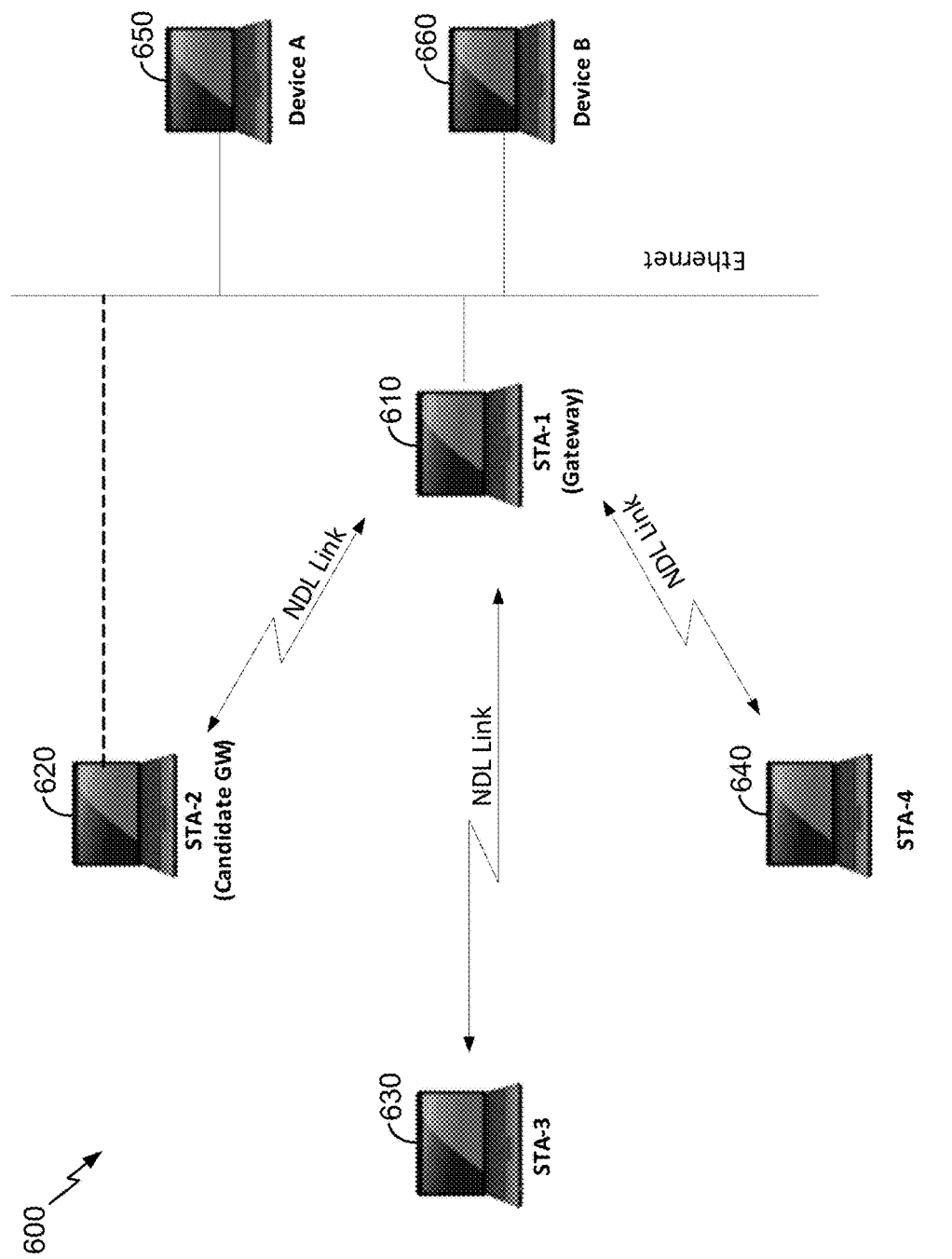

Referring to FIG. 6A, a particular implementation of a system 600 that enables a NAN device to provide backhaul connectivity is shown. The system 600 includes a NAN device 610 (STA-1), a NAN device 620 (STA-2), a NAN device 630 (STA-3), a NAN device 640 (STA-4), a device 650 (Device A), and a device 660 (Device B).

The NAN device 610 may communicate with the other NAN devices 620-640 using NAN data link links (NDL links). According to one implementation, the NAN devices 610-640 may be included in a NAN or a NAN data path network. The NAN device 610 may be a gateway device that provides backhaul connectivity (or Ethernet connectivity) to the other NAN devices 620-640. Once part of the NAN, the gateway device may advertise or publish a gateway service by broadcasting service discovery frames on the NAN during NAN discovery windows. Upon detecting the gateway service on the NAN, the other NAN devices 620-640 may associate and establish a secure link with the NAN device 610. The NAN device 620 may be designated as a candidate gateway device. The candidate gateway device may perform the functions of the gateway device if the gateway device (e.g., the NAN device 610) relinquishes its gateway responsibilities. According to one implementation, two (or more) of NAN devices 610-640 may participate in a video chat session with devices 650, 660 on the Ethernet. The video sessions may continue after the gateway operations have switched (from the gateway device to the candidate gateway device) with little or no interruption.

Figure 6B:
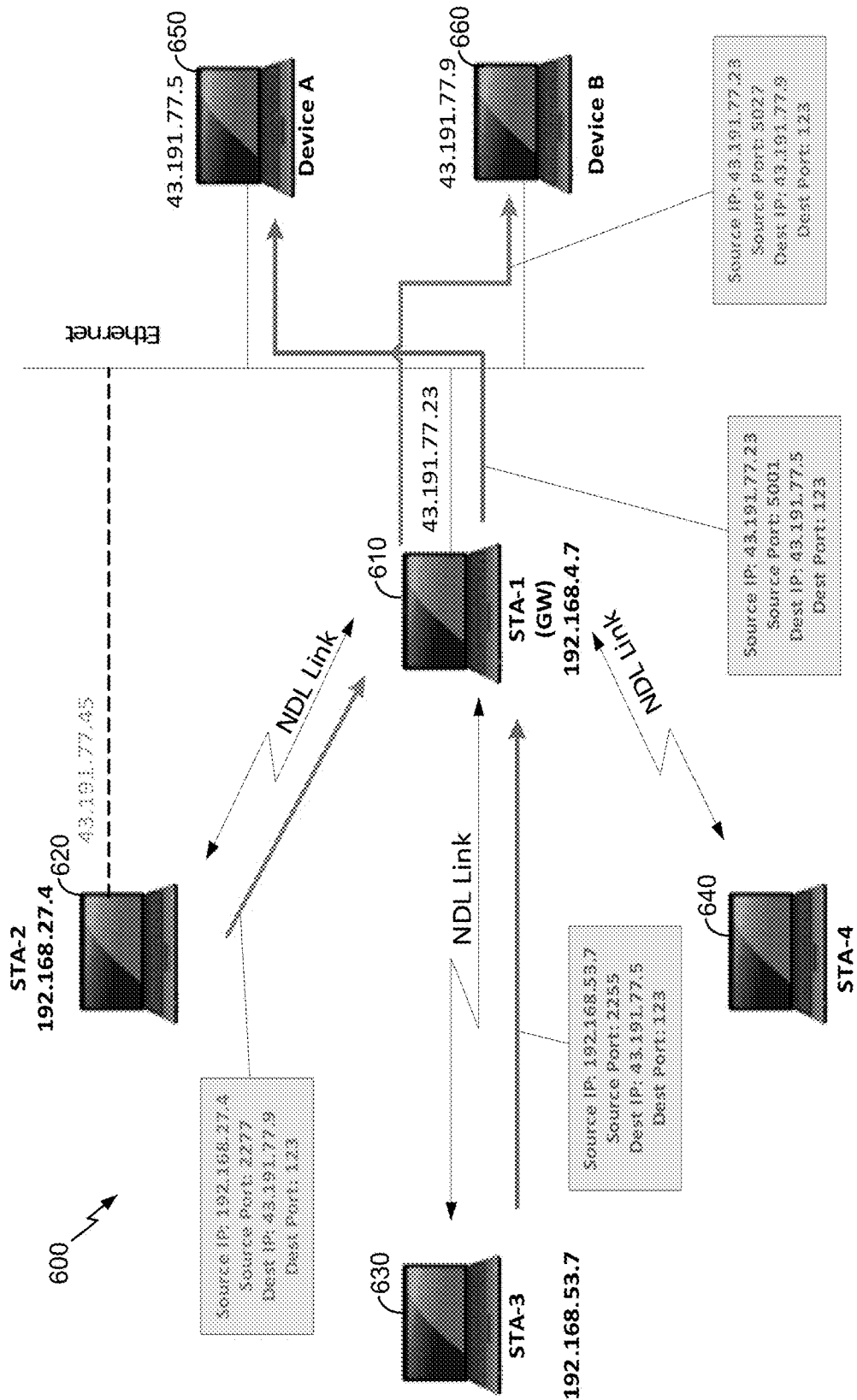

Referring to FIG. 6B, another particular implementation of the system 600 is shown. According to FIG. 6B, each NAN device 620-640 may identify with the gateway device (e.g., the NAN device 610) as its default IP routing gateway. An IP packet that does not match the NDL's IP subnet may be transmitted along an NDL link to the gateway device. The gateway device may implement and maintain a network address translation (NAT) table to map active IP sessions between NAN devices 620-640 in the NAN and the devices 650, 660 outside of the NAN. Thus, a gateway device may manage and maintain an IP session between a device on the NDL and a device on the infrastructure using a NAT table.

Figure 6C:
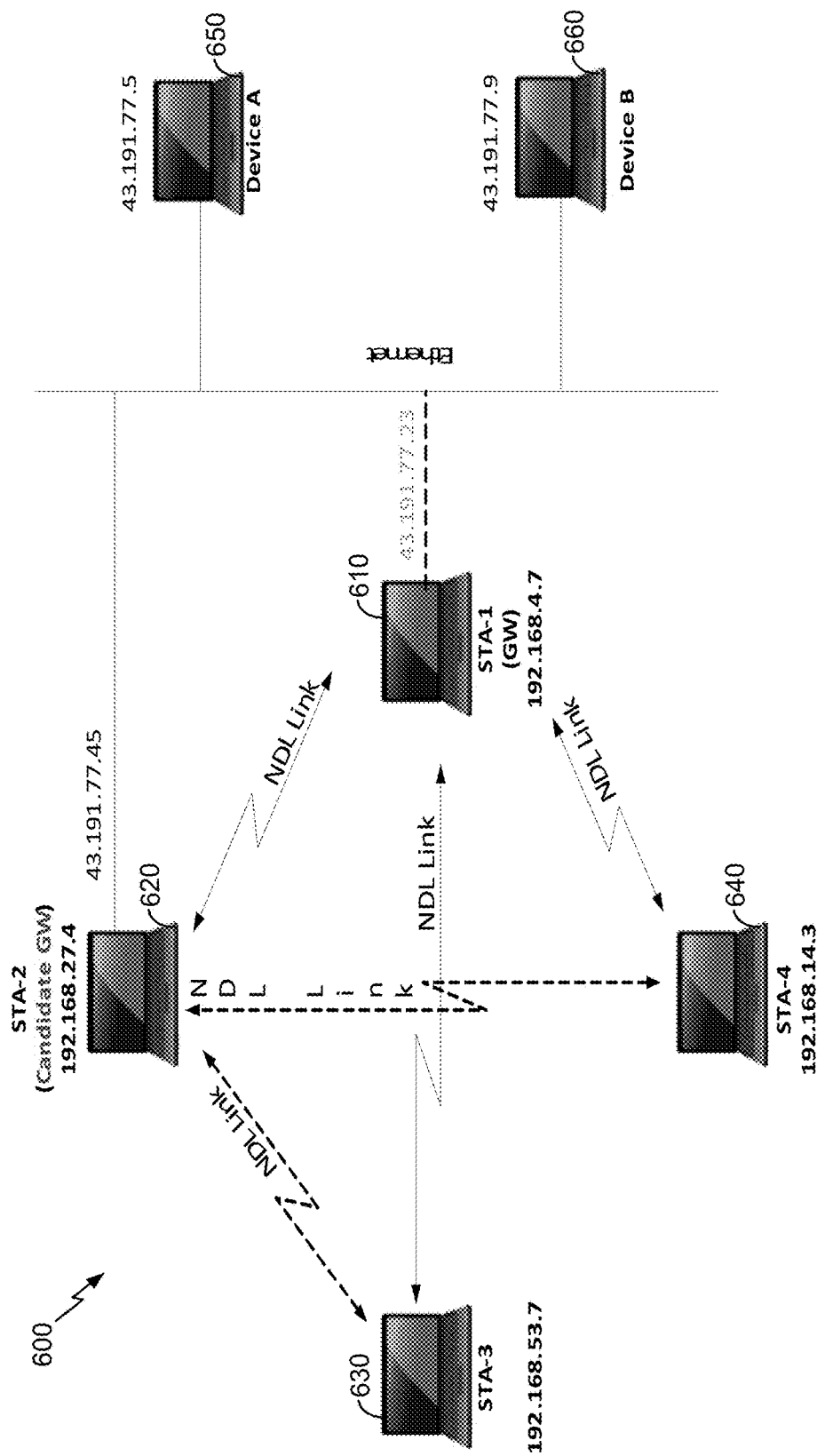

Referring to FIG. 6C, another particular implementation of the system 600 is shown. As described above, the candidate gateway device (e.g., the NAN device 620) may perform the responsibilities of the gateway device (e.g., the NAN device 610) if the gateway device relinquishes its gateway responsibilities. For example, the gateway device may send a "prepare" message to the candidate gateway device indicating that the gateway device will soon relinquish its gateway responsibilities. Upon receiving the prepare message, the candidate gateway device may send an acknowledgment message to the gateway device to indicate that the candidate gateway device received the prepare message. According to one implementation, the prepare message and the acknowledgment message may include User Datagram Protocol (UDP) data frames protected at a link-layer by a pairwise key established between the two devices.

After acknowledging the prepare message, the candidate gateway device may begin advertising (or publishing) a candidate gateway service on the NAN by broadcasting service discovery frames during each NAN data window. Upon detecting the service discovery frames, one or more of the NAN devices 610, 630, 640 may associate and establish a secure link with the candidate gateway device.

Additionally, or in the alternative, the gateway device may send an "end gateway" message to the candidate gateway device indicating that the gateway device is relinquishing gateway responsibility. Upon receiving the end gateway message, the candidate gateway device may send an acknowledgment message to the gateway device to indicate that the candidate gateway device received the end gateway message. According to one implementation, the end gateway message and the acknowledgment message may include UDP data frames protected at a link-layer by a pairwise key established between the two devices.

Figure 6D:
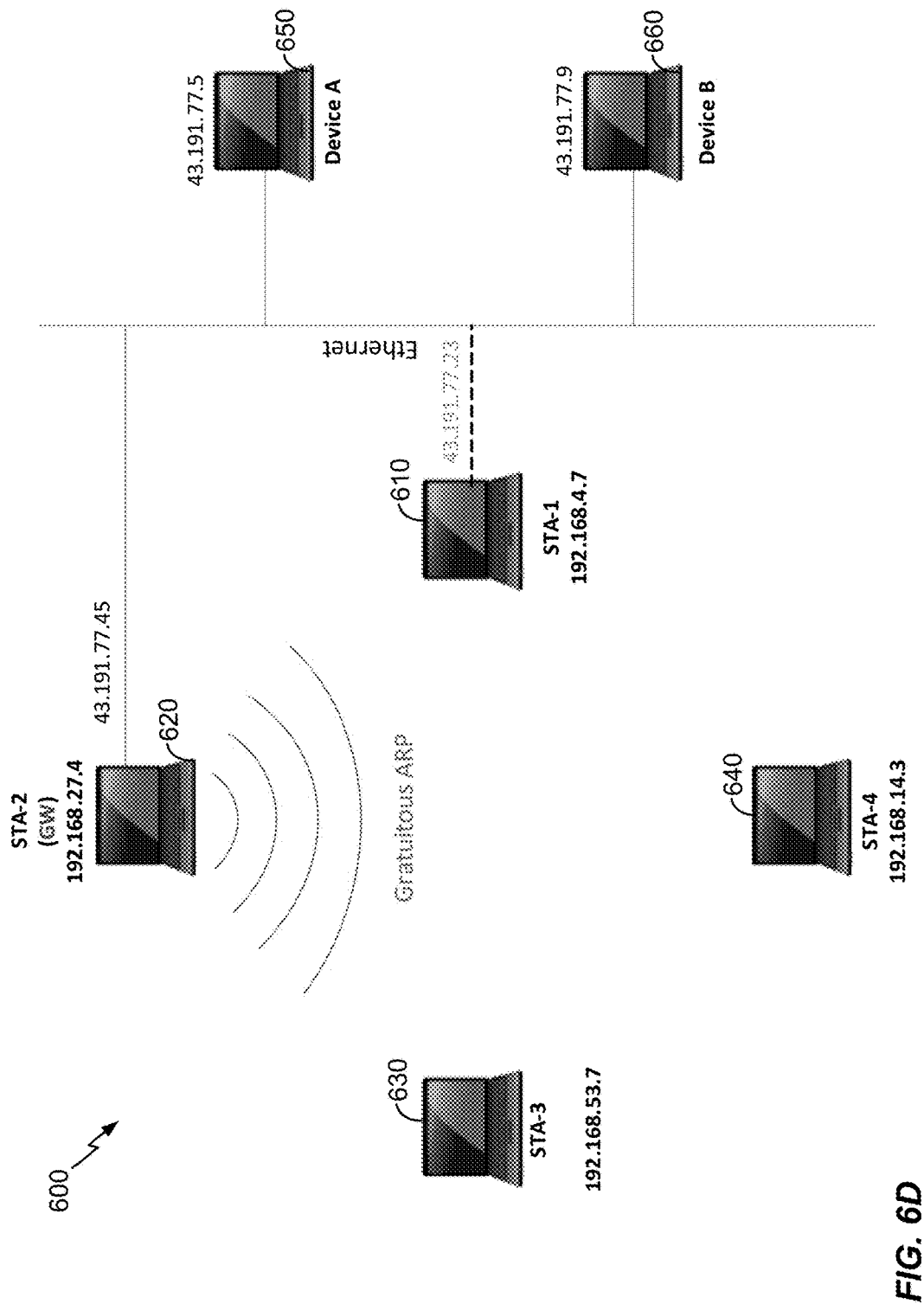
Figure 6E:
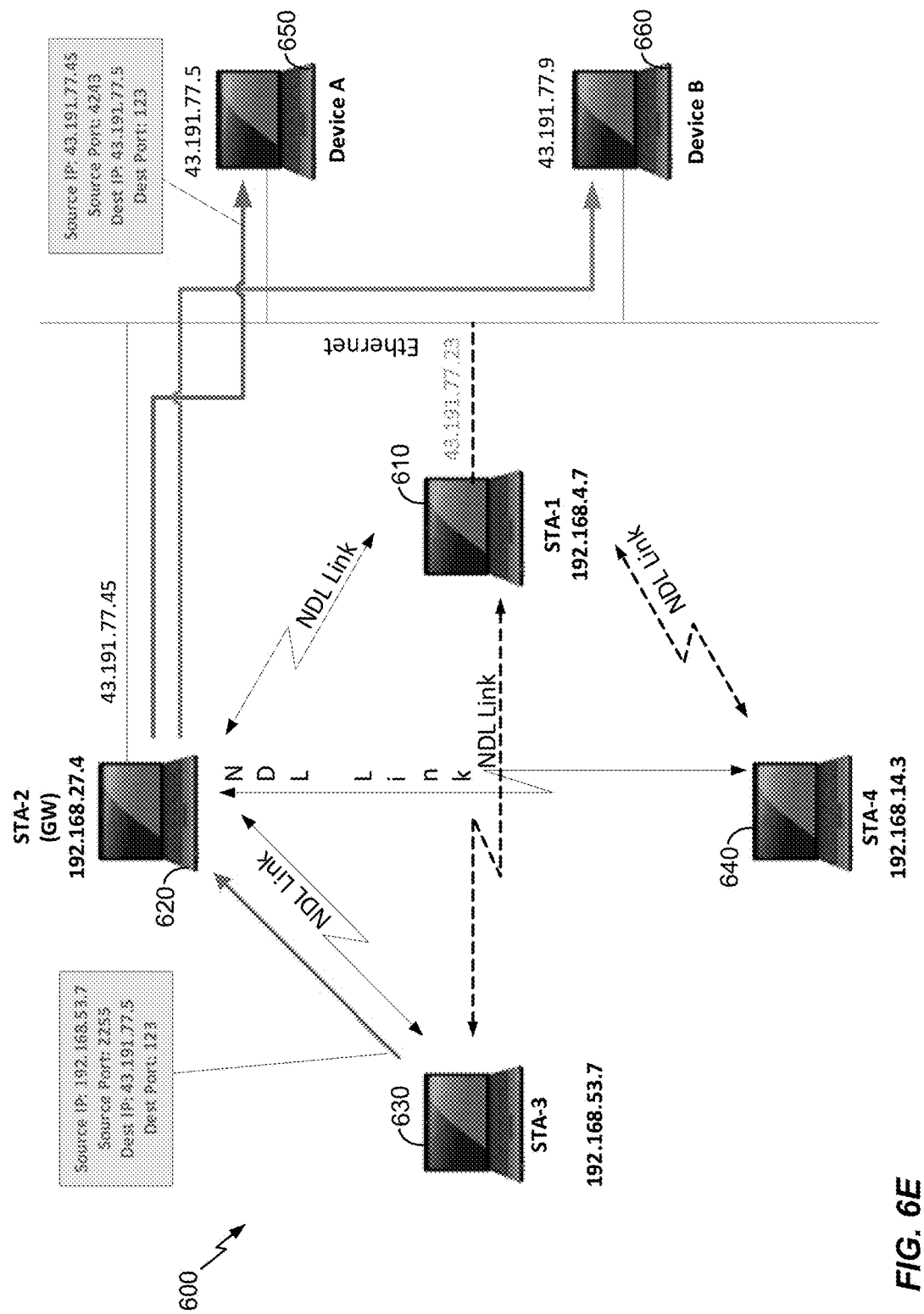

Referring to FIG. 6D, another particular implementation of the system 600 is shown. According to FIG. 6D, after the NAN device 620 "takes over" the gateway responsibilities from the NAN device 610, the NAN device 620 may send a gratuitous address resolution protocol (ARP) message to each NAN device 610, 630, 640 to indicate that the NAN device 620 is the new gateway. The gratuitous ARP message may be protected using a pairwise key, and the NAN device 620 may send a traffic announcement during a paging window so the NAN devices 610, 630, 640 are "awake" to receive the gratuitous ARP message. According to some implementations, a default route to the infrastructure may be updated when the NAN device 620 takes over the gateway responsibilities. The NAN device 620 may advertise information to other NAN devices 610, 630, 640 to enable the change in the default route.

Upon receiving the gratuitous ARP message, the NAN devices 610, 630, 640 may identify the NAN device 620 as the new gateway device and modify the default IP gateway address to the IP address of the NAN device 620. Subsequent packets destined for an IP outside of the NDL subnet may be transmitted to the NAN device 620 and may be protected with a pairwise key established with the NAN device 620. The NAN device 620 may implement and maintain a NAT table to map active IP sessions between the NAN devices 610, 630, 640 and the devices 650, 630 outside of the NAN. As shown with respect to FIG. 6E, the video chat session may continue using the NAN device 620 as the new gateway device.

According to the techniques of the present disclosure, NAN devices may advertise infrastructure capability services on the NAN upon joining a NAN cluster. Each NAN device may function as a provider of the service and may transmit NAN service discovery frames during NAN discovery windows. The NAN service discovery frames may include a NAN service descriptor attribute and a NAN service ID attribute. A service information field of the NAN service descriptor attribute may indicate infrastructure capability information of a NAN device. The infrastructure capability information may indicate a cellular strength of the NAN device, a wired/congestion speed associated with the NAN device, or other infrastructure parameters that may indicate performance metrics. If the NAN device has no infrastructure connectivity, the infrastructure capability field may have a value of zero. In some implementations, the infrastructure capability field may evaluate the Wi-Fi capabilities of the NAN device. For example, a NAN device having access to the infrastructure but also having low Wi-Fi signal strength may not be an effective gateway. In some implementations, the infrastructure capability field may be normalized such that it can uniformly represent the infrastructure capabilities regardless of the infrastructure type.

Software on a NAN device may gather the capability information advertised on the NAN and may determine the nearest gateway device and/or determine whether the NAN device should take on the gateway role. Each NAN device may proxy received service discovery announcements for a gateway service by rebroadcasting the service discovery announcements. Thus, multiple hops may be used for gateway discovery.

In order to join a gateway device's NAN data link, a NAN device may initiate a secure association with the gateway device during a paging window. The gateway device MAC address may be available via the NAN data link attribute and the paging window occurrence may be computed based on a NAN data link control field of the NAN data link attribute. If an isolated device is not in range of the gateway device, the isolated device may receive the gateway device's attributes by an intermediate device's proxy. In addition to direction association with gateway devices, NAN device along a routing path may establish a pairwise association with neighbors along the routing path. For example, an isolated device and an intermediate device may establish a secure association and may derive a unicast key to encrypt traffic.

In some implementations, an infrastructure service may be enabled via settings in a device. For example, a network settings menu of the device may include options to enable the infrastructure service. The settings may further allow the device to act as a publisher of the infrastructure service. In such a scenario, the settings may also enable bridging of an NDL interface and an infrastructure interface and may also allow forwarding of packets between the NDL interface and the infrastructure interface. According to one implementation, the device may control IP address mapping. Once enabled, the device may begin publishing the infrastructure service on the NAN. In another scenario, the settings may also allow the device to act as a subscriber of an infrastructure service, in which case, the device may begin to search for the infrastructure service on the NAN.

In some implementations, an infrastructure service may have a service identifier that is identifiable by multiple publishers and/or subscribers. For example, the service identifier may be standardized. Publishers may use the service identifier to advertise the infrastructure service, and subscribers may use the service identifier to discover the infrastructure service.

In some implementations, a publisher of an infrastructure service may publish (or act as a proxy to) services available on the infrastructure network. For example, an NDL device connected to Ethernet may proxy services available on the Ethernet. The NDL device may forward data related to the services on the infrastructure network between a device on an NDL and the infrastructure network.

Referring to FIG. 7A, a particular implementation of a method 700 for announcing a data network infrastructure service in a NAN data path network is shown. The method 700 may be performed at any of the NAN devices 110-160 of FIG. 1, any of the NAN devices 310-340 of FIG. 3, any of the NAN access points 410, 420, 430 of FIG. 4, or any of the NAN devices 610-640 of FIGS. 6A-6E.

The method 700 may include accessing, at a first NAN device of a plurality of NAN devices, a data network infrastructure to obtain information regarding the data network infrastructure service, at 702. For example, referring to FIG. 1, the first NAN device 110 may access the infrastructure 102 via the gateway 106. Based on the access to the infrastructure 102, the first NAN device 110 may subscribe to an infrastructure service via the gateway 104. The information regarding the data network infrastructure service may indicate a service carrier of the data network infrastructure. Additional information may include the information described with respect to FIG. 2.

The method 700 may include sending, from the first NAN device to a second NAN device of the plurality of NAN devices, a service announcement associated with the data network infrastructure service to announce the data network infrastructure service to the second NAN device, at 704. The NAN data path network includes the plurality of NAN devices. For example, referring to FIG. 1, the first NAN device 110 may provide a service announcement 190 to the second NAN device 120. The service announcement 190 may advertise the infrastructure service to the second NAN device 120 and may also include information for connecting the second NAN device to the infrastructure 102. The service announcement 190 may also include an information element (IE) defining attributes of the service.

According to one implementation of the method 700, the service announcement includes information associated with enabling communication between the second NAN device and an infrastructure device of the data network infrastructure. According to one implementation of the method 700, the first NAN device accesses the data network infrastructure using a gateway device, and the service announcement includes a media access control (MAC) address of the gateway device and a MAC address of the first NAN device.

Referring to FIG. 7B, a particular implementation of a method 710 for establishing a relay point between a NAN device and data network infrastructure is shown. The method 710 may be performed at any of the NAN devices 110-160 of FIG. 1, any of the NAN devices 310-340 of FIG. 3, any of the NAN access points 410, 420, 430 of FIG. 4, or any of the NAN devices 610-640 of FIGS. 6A-6E.

The method 710 may be performed in conjunction with the method 700 of FIG. 7A. The method 710 may include receiving, at the first NAN device, a path request message from the second NAN device, at 712. According to the method 710, a destination address of the path request message corresponds to the MAC address of the gateway device.

The method 710 may also include generating, at the first NAN device, a path replay message in response to receiving the path request message from the second NAN device, at 714. According to the method 710, the path replay message designates the first NAN device as a relay point between the second NAN device and the gateway device. The method 710 may also include sending the path replay message from the first NAN device to the second NAN device, at 716. The method 710 may further include sending the path request message from the first NAN device to the gateway device, at 718. According to one implementation of the method 710, the path request message and the path replay message may be generated using a hybrid wireless mesh protocol (HWMP).

According to one implementation, the one or more of the methods 700, 710 may include forwarding packets between the gateway device and the second NAN device to enable the second NAN device to access the infrastructure. For example, the methods 700, 710 may include receiving, at the first NAN device, first data packets from the second NAN device. The methods 700, 710 may also include sending the first data packets from the first NAN device to the infrastructure device. As another example, the methods 700, 710 may include receiving, at the first NAN device, second data packets from the infrastructure device. The method 700, 710 may also include sending the second data packets from the first NAN device to the second NAN device.

According to one implementation, the methods 700, 710 may also include receiving, at the first NAN device, a dynamic host configuration protocol (DHCP) request from the second NAN device. The methods 700, 710 may also include sending the DHCP request from the first NAN device to the gateway device. The methods 700, 710 may also include receiving, at the first NAN device, an internet protocol (IP) address of the second NAN device from the gateway device. The IP address may be based on the DHCP request. The method 700, 710 may also include sending the IP address to the second NAN device.

According to one implementation of at least one of the method 700, 710, the data network infrastructure service includes at least one of an internet service, a cloud-based service, an application service, or a file-sharing service. According to one implementation of at least one of the methods 700, 710, the second NAN device sends the service announcement to a third NAN device of the plurality of NAN devices in response to receiving the service announcement from the first NAN device.

The methods 700, 710 may include performing, at the first NAN device, a negotiation process with other NAN devices of the plurality of NAN devices to designate a particular NAN device of the plurality of NAN devices as a gateway device to the data network infrastructure. The negotiation process may include comparing, at the first NAN device, a parameter of the first NAN device to corresponding parameters of other NAN devices of the plurality of NAN devices. The negotiation process may also include designating the particular NAN device as the gateway device based on the comparison. To illustrate, the first NAN device may operate as the gateway to the infrastructure based on comparing one or more parameters (e.g., a signal strength, a latency, a throughput, etc.) associated with the first NAN device and the one or more corresponding parameters associated with the one or more other NAN devices.

The methods 700, 710 may also include designating, at the first NAN device, a second particular NAN device of the plurality of NAN devices as a candidate gateway device to the data network infrastructure based on the negotiation process. The second particular NAN device may be configured to replace particular NAN device as the gateway device if the particular NAN device loses connectivity to the data network infrastructure. According to one implementation, the gateway device is configured to manage an internet protocol (IP) session between the plurality of NAN devices and the data network infrastructure. The gateway device may also maintain the IP session between the plurality of NAN devices and the data network infrastructure using IP mapping.

The methods 700, 710 of FIGS. 7A-7B may enable multi-hop service discovery and multi-hop infrastructure access. For example, the methods 700, 710 may enable NAN devices 120-160 to access the infrastructure 102 and subscribe to the service associated with the infrastructure via the first NAN device 110. For example, the first NAN device 110 may function as an access point and advertise the service to other devices within the NAN data path network 108. Thus, multi-hop service discovery and multi-hop connectivity according to an IEEE 802.11s protocol may be implemented within the NAN data path network 108 to provide infrastructure access to the NAN devices 120-160 that are not "directly coupled" to the gateway 106.

The methods 700, 710 may enable multi-hop service discovery and multi-hop connectivity within the system 300 of FIG. 3 and within the NAN data path network 408 of FIG. 4. For example, the legacy device 350 of FIG. 3 may access the source device 302 and subscribe to the service of the source device 302 via the NAN devices 310-340. Thus, accessing the source device 302 may be implemented using multiple hops among the NAN devices 310-340. Additionally, the wireless NAN data path network 408 of FIG. 4 may enable the client devices 415, 425, 435 to access the infrastructure 102 and to subscribe to one or more services associated with the infrastructure 102 via the NAN access point 410. For example, the first client device 415 may access the infrastructure 102 via single-hop discovery, and the second and third client devices 425, 435 may access the infrastructure 102 via multi-hop discovery.

Referring to FIG. 8, another particular implementation of a method 800 for accessing infrastructure via a NAN data path network is shown. The method 800 may be performed at any of the NAN devices 110-160 of FIG. 1, any of the NAN devices 310-340 of FIG. 3, any of the NAN access points 410, 420, 430 of FIG. 4, or any of the NAN devices 610-640 of FIGS. 6A-6E.

The method 800 includes receiving, at a second NAN device, a service announcement from a first NAN device, at 802. For example, referring to FIG. 1, the second NAN device 120 may receive the service announcement 190 from the first NAN device 110. The first NAN device 110 and the second NAN device 120 may be included in the NAN data path network 108.

The second NAN device may proxy the service announcement to another NAN device in the NAN data path network, at 804. For example, referring to FIG. 1, the second NAN device 120 may proxy the service announcement 190 to the fifth NAN device 150 by modifying content of the service announcement, such as a source address, a number of hops, etc., and sending the modified service announcement to the fifth NAN device 150. Upon receiving the service announcement 190, the fifth NAN device 150 may subscribe to a service via an authentication process. For example, the fifth NAN device 150 may send a path request message to the second NAN device 120 using a hybrid wireless mesh protocol (HWMP). Upon receiving the path request message, the second NAN device 120 may forward the path request message to the first NAN device 110 and send a path reply message to the fifth NAN device 150. The path reply message may designate the second NAN device 120 as a relay point to the gateway 106.

The method 800 of FIG. 8 may enable NAN devices 120-160 to access the infrastructure 102 and subscribe to the service associated with the infrastructure via the first NAN device 110. For example, the first NAN device 110 may function as an access point and may advertise the service to other devices within the NAN data path network 108. Thus, multi-hop service discovery and multi-hop connectivity may be implemented by the NAN data path network 108 to provide infrastructure access to the NAN devices 120-160 that are not "directly coupled" to the gateway 106.

Referring to FIG. 9, a particular illustrative implementation of a wireless communication device is depicted and generally designated 900. The device 900 includes a processor 910, such as a digital signal processor, coupled to a memory 932. In an illustrative implementation, the device 900, or components thereof, may correspond to any of the NAN devices 110-160 of FIG. 1, any of the NAN devices 310-340 of FIG. 3, the legacy device 350 of FIG. 3, any of the NAN access points 410, 420, 430 of FIG. 4, any of the client devices 415, 425, 435 of FIG. 4, or any of the NAN devices 610-640 of FIGS. 6A-6E.

The processor 910 may be configured to execute software, such as a program of one or more instructions 968, stored in the memory 932. Additionally or alternatively, the processor 910 may be configured to execute one or more instructions stored in a memory of a wireless interface 940, such as an IEEE 802.11 interface. For example, the wireless interface 940 may be configured to operate in accordance with the IEEE 802.11s standard. In a particular implementation, the processor 910 may be configured to operate in accordance with the method 700 of FIG. 7A, the method 710 of FIG. 7B, and/or the method 800 of FIG. 8.

The wireless interface 940 may be coupled to the processor 910 and to an antenna 942. For example, the wireless interface 940 may be coupled to the antenna 942 via a transceiver 946, such that wireless data received via the antenna 942 may be provided to the processor 910.

A coder/decoder (CODEC) 934 can also be coupled to the processor 910. A speaker 936 and a microphone 938 can be coupled to the CODEC 934. A display controller 926 can be coupled to the processor 910 and to a display device 928. In a particular implementation, the processor 910, the display controller 926, the memory 932, the CODEC 934, and the wireless interface 940 are included in a system-in-package or system-on-chip device 922. In a particular implementation, an input device 930 and a power supply 944 are coupled to the system-on-chip device 922. Moreover, in a particular implementation, as illustrated in FIG. 9, the display device 928, the input device 930, the speaker 936, the microphone 938, the antenna 942, and the power supply 944 are external to the system-on-chip device 922. However, each of the display device 928, the input device 930, the speaker 936, the microphone 938, the antenna 942, and the power supply 944 can be coupled to one or more components of the system-on-chip device 922, such as one or more interfaces or controllers.

In conjunction with the described implementations, an apparatus includes means for accessing a data network infrastructure to obtain information regarding a data network infrastructure service. The means for accessing is included in a first NAN device of a plurality of NAN devices. For example, the means for accessing the data network infrastructure may include any of the NAN devices 110-160 of FIG. 1, any of the NAN devices 310-340 of FIG. 3, the legacy device 350 of FIG. 3, any of the NAN access points 410, 420, 430 of FIG. 4, any of the client devices 415, 425, 435 of FIG. 4, any of the NAN devices 610-640 of FIGS. 6A-6E, the wireless interface 940 of FIG. 9, the processor 910 programmed to execute the instructions 968 of FIG. 9, one or more other devices, circuits, modules, or any combination thereof. For example, the processor 910 may be programmed to receive a message indicating a service and a network device associated with the service. The message may include a MAC address of the network device. Upon receiving the message, the processor 910 may generate a service request and send the service request to the network device. The processor 910 may receive an acknowledgment from the network device to obtain access to the infrastructure.

The apparatus also includes means for sending a service announcement associated with the data network infrastructure service from the first NAN device to a second NAN device of the plurality of NAN devices. The service announcement may announce the data network infrastructure service to the second NAN device, and the NAN data path network includes the plurality of NAN devices. For example, the means for sending the service announcement may include any of the NAN devices 110-160 of FIG. 1, any of the NAN devices 310-340 of FIG. 3, the legacy device 350 of FIG. 3, any of the NAN access points 410, 420, 430 of FIG. 4, any of the client devices 415, 425, 435 of FIG. 4, any of the NAN devices 610-640 of FIGS. 6A-6E, the wireless interface 940 of FIG. 9, the processor 910 programmed to execute the instructions 968 of FIG. 9, one or more other devices, circuits, modules, or any combination thereof. For example, the processor 910 may retrieve (from the memory 932) one or more identifiers of NAN devices within a one-hop range of the device 900. The processor 910 may generate a service announcement that includes the identifier of the device 900. For example, the processor 910 may populate the service announcement with information in the IE 200 of FIG. 2. The processor 910 may also send the service announcement to the NAN devices within a one-hop range corresponding to the retrieved identifiers.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (or non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal In the alternative, the processor and the storage medium may reside as discrete components in a computing device or user terminal The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus for use with a Neighbor Awareness Networking (NAN) data path network, the apparatus comprising:
 a processor; and
 a memory coupled to the processor, wherein the memory stores instructions that are executable by the processor to perform operations comprising:
  performing, at a first NAN device of a plurality of NAN devices, a negotiation process with other NAN devices of the plurality of NAN devices to designate a particular NAN device of the plurality of NAN devices as a gateway device to data network infrastructure, the negotiation process comprising:
   comparing parameters of the first NAN device to corresponding parameters of other NAN devices of the plurality of NAN devices, the parameters comprising signal strength, latency, and throughput; and
   designating the first NAN device as the gateway device based on the comparisons;
  accessing, at the first NAN device, the data network infrastructure to obtain information regarding a data network infrastructure service, the first NAN device distinct from the data network infrastructure;
  sending a service announcement associated with the data network infrastructure service from the first NAN device to a second NAN device of the plurality of NAN devices to announce the data network infrastructure service to the second NAN device, wherein the NAN data path network includes the plurality of NAN devices; and
  receiving at least one subscription from at least one of the plurality of NAN devices in response to sending the service announcement.

2. The apparatus of claim 1, wherein the information regarding the data network infrastructure service indicates a service carrier of the data network infrastructure service.

3. The apparatus of claim 1, wherein the service announcement includes information associated with enabling communication between the second NAN device and an infrastructure device of the data network infrastructure.

4. The apparatus of claim 3, the operations further comprising:
 receiving, at the first NAN device, first data packets from the second NAN device;
 sending the first data packets from the first NAN device to the infrastructure device;
 receiving, at the first NAN device, second data packets from the infrastructure device; and
 sending the second data packets from the first NAN device to the second NAN device.

5. The apparatus of claim 1, the operations further comprising:
 receiving, at the first NAN device, a path request message from the second NAN device, wherein a destination address of the path request message corresponds to a media access control (MAC) address of the gateway device;
 generating, at the first NAN device, a path reply message in response to receiving the path request message from the second NAN device, the path reply message designating the first NAN device as a relay point between the second NAN device and the gateway device;
 sending the path reply message from the first NAN device to the second NAN device; and
 sending the path request message from the first NAN device to the gateway device.

6. The apparatus of claim 1, the operations further comprising:
 receiving, at the first NAN device, a dynamic host configuration protocol (DHCP) request from the second NAN device;
 sending the DHCP request from the first NAN device to the gateway device;
 receiving, at the first NAN device, an internet protocol (IP) address of the second NAN device from the gateway device, the IP address based on the DHCP request; and
 sending the IP address to the second NAN device.

7. The apparatus of claim 1, wherein the data network infrastructure service includes at least one of an internet service, a cloud-based service, an application service, or a file-sharing service.

8. The apparatus of claim 1, wherein the second NAN device is configured to send the service announcement to a third NAN device of the plurality of NAN devices in response to receiving the service announcement from the first NAN device.

9. The apparatus of claim 1, the operations further comprising designating, at the first NAN device, a second particular NAN device of the plurality of NAN devices as a candidate gateway device to the data network infrastructure based on the negotiation process, the second particular NAN device configured to replace the first NAN device as the gateway device if the first NAN device loses connectivity to the data network infrastructure.

10. The apparatus of claim 1, wherein the gateway device is configured to manage an internet protocol (IP) session between the plurality of NAN devices and the data network infrastructure.

11. A method for use with a Neighbor Awareness Networking (NAN) data path network, the method comprising:
 performing, at a first NAN device of a plurality of NAN devices, a negotiation process with other NAN devices of the plurality of NAN devices to designate a particular NAN device of the plurality of NAN devices as a gateway device to data network infrastructure, the negotiation process comprising:
  comparing parameters of the first NAN device to corresponding parameters of other NAN devices of the plurality of NAN devices, the parameters comprising signal strength, latency, and throughput; and
  designating the first NAN device as the gateway device based on the comparisons;
 accessing, at the first NAN device, the data network infrastructure to obtain information regarding a data network infrastructure service, the first NAN device distinct from the data network infrastructure;
 sending a service announcement associated with the data network infrastructure service from the first NAN device to a second NAN device of the plurality of NAN devices to announce the data network infrastructure service to the second NAN device, wherein the NAN data path network includes the plurality of NAN devices; and
 receiving at least one subscription from at least one of the plurality of NAN devices in response to sending the service announcement.

12. The method of claim 11, wherein the information regarding the data network infrastructure service indicates a service carrier of the data network infrastructure service.

13. The method of claim 11, wherein the service announcement includes information associated with enabling communication between the second NAN device and an infrastructure device of the data network infrastructure.

14. The method of claim 13, wherein the information associated with enabling communication between the second NAN device and the infrastructure device includes a media access control (MAC) address of the first NAN device.

15. The method of claim 11, further comprising:
receiving, at the first NAN device, first data packets from the second NAN device;
sending the first data packets from the first NAN device to the infrastructure device;
receiving, at the first NAN device, second data packets from the infrastructure device; and
sending the second data packets from the first NAN device to the second NAN device.

16. The method of claim 11, further comprising:
receiving, at the first NAN device, a path request message from the second NAN device, wherein a destination address of the path request message corresponds to a media access control (MAC) address of the gateway device;
generating, at the first NAN device, a path reply message in response to receiving the path request message from the second NAN device, the path reply message designating the first NAN device as a relay point between the second NAN device and the gateway device;
sending the path reply message from the first NAN device to the second NAN device; and
sending the path request message from the first NAN device to the gateway device.

17. The method of claim 11, further comprising:
receiving, at the first NAN device, a dynamic host configuration protocol (DHCP) request from the second NAN device;
sending the DHCP request from the first NAN device to the gateway device;
receiving, at the first NAN device, an internet protocol (IP) address of the second NAN device from the gateway device, the IP address based on the DHCP request; and
sending the IP address to the second NAN device.

18. The method of claim 11, wherein the data network infrastructure service is an internet service, a cloud-based service, an application service, or a file-sharing service.

19. The method of claim 11, wherein the second NAN device sends the service announcement to a third NAN device of the plurality of NAN devices in response to receiving the service announcement from the first NAN device.

20. The method of claim 11, further comprising designating, at the first NAN device, a second particular NAN device of the plurality of NAN devices as a candidate gateway device to the data network infrastructure based on the negotiation process, the second particular NAN device configured to replace the first NAN device as the gateway device if the first NAN device loses connectivity to the data network infrastructure.

21. The method of claim 11, wherein the gateway device is configured to manage an internet protocol (IP) session between the plurality of NAN devices and the data network infrastructure.

22. A non-transitory computer-readable medium comprising instructions that, when executed by a processor, cause the processor to perform operations for use with a Neighbor Awareness Networking (NAN) data path network, the operations comprising:
performing, at a first NAN device of a plurality of NAN devices, a negotiation process with other NAN devices of the plurality of NAN devices to designate a particular NAN device of the plurality of NAN devices as a gateway device to data network infrastructure, the negotiation process comprising:
comparing parameters of the first NAN device to corresponding parameters of other NAN devices of the plurality of NAN devices, the parameters comprising signal strength, latency, and throughput; and
designating the first NAN device as the gateway device based on the comparisons;
accessing, at the first NAN device, the data network infrastructure to obtain information regarding a data network infrastructure service, the first NAN device distinct from the data network infrastructure;
sending a service announcement associated with the data network infrastructure service from the first NAN device to a second NAN device of the plurality of NAN devices to announce the data network infrastructure service to the second NAN device, wherein the NAN data path network includes the plurality of NAN devices; and
receiving at least one subscription from at least one of the plurality of NAN devices in response to sending the service announcement.

23. The non-transitory computer-readable medium of claim 22, wherein the service announcement includes information associated with enabling communication between the second NAN device and an infrastructure device of the data network infrastructure.

24. An apparatus for use with a Neighbor Awareness Networking (NAN) data path network, the apparatus comprising:
means for performing, at a first NAN device of a plurality of NAN devices, a negotiation process with other NAN devices of the plurality of NAN devices to designate a particular NAN device of the plurality of NAN devices as a gateway device to data network infrastructure, the first NAN device distinct from the data network infrastructure, and the negotiation process comprising:
comparing parameters of the first NAN device to corresponding parameters of other NAN devices of the plurality of NAN devices, the parameters comprising signal strength, latency, and throughput; and
designating the first NAN device as the gateway device based on the comparisons;
means for accessing data network infrastructure to obtain information related to a data network infrastructure service;
means for sending a service announcement associated with the data network infrastructure service from the first NAN device to a second NAN device of the plurality of NAN devices, wherein the NAN data path network includes the plurality of NAN devices; and
means for receiving at least one subscription from at least one of the plurality of NAN devices in response to sending the service announcement.

* * * * *